United States Patent [19]
Westlinning et al.

[11] 3,923,724
[45] Dec. 2, 1975

[54] PROCESSES FOR IMPROVING THE PROCESSING CHARACTERISTICS OF VULCANIZED ELASTOMERS

[75] Inventors: Hermann Westlinning, Kleinostheim; Siegfried Wolff, Bruehl-Cologne; Werner Schwarze, Frankfurt, all of Germany

[73] Assignee: Deutsche Gold- und Silber-Scheideanstalt vormals Roessler, Frankfurt am Main, Germany

[22] Filed: May 15, 1974

[21] Appl. No.: 470,032

Related U.S. Application Data

[63] Continuation-in-part of Ser. No. 122,190, March 8, 1971, abandoned, which is a continuation-in-part of Ser. No. 715,541, March 25, 1968, abandoned.

[30] Foreign Application Priority Data

Mar. 23, 1967 Germany............................ 1669954

[52] U.S. Cl.... 260/33.6 AQ; 260/42.32; 260/42.33; 260/42.36; 260/42.37; 260/42.38; 260/80.7; 260/83.3; 260/85.1; 260/85.3 C; 260/249.8; 260/759; 260/763; 260/765; 260/791
[51] Int. Cl.².... C08K 3/04; C08K 3/20; C08K 5/01; C08K 5/34
[58] Field of Search............ 260/42.37, 42.38, 249.8, 260/791, 763, 765, 80.7, 83.3 R, 85.1, 85.3 C, 33.6 AQ, 759, 42.33, 42.32, 42.36

[56] References Cited
UNITED STATES PATENTS

| | | | |
|---|---|---|---|
| 2,320,819 | 6/1943 | D'Alelio et al. | 260/249.8 |
| 2,892,807 | 6/1959 | Sellers et al. | 106/308 N |
| 3,321,453 | 5/1967 | Breslow | 260/88.2 |
| 3,366,598 | 1/1968 | Westlinning et al. | 260/42.38 |

OTHER PUBLICATIONS

Rubber World–Matls. & Compounding Ingredients for Rubber & Plastics (1965) (N.Y.), pp. 68 & 69.

*Primary Examiner*—Donald E. Czaja
*Assistant Examiner*—H. H. Fletcher
*Attorney, Agent, or Firm*—Michael S. Striker

[57] ABSTRACT

Processes for producing a vulcanized elastomeric composition which includes a filler and has improved processing characteristics which processes comprise vulcanizing a vulcanizable composition containing: (a) at least one halogen-free elastomer of the group consisting of natural rubber, polyisoprenes, polybutadienes, copolymers of butadiene and styrene, copolymers of butadiene and acrylonitrile, copolymers of isoprene and isobutene, copolymers of butadiene and isobutene, terpolymers of ethylene, propylene, and dienes, mixtures of the said elastomers with each other, and oil-extended elastomers of the said elastomers, (b) a reinforcing filler, (c) sulfur, and (d) a sym-triazinyl disulfide vulcanizing agent.

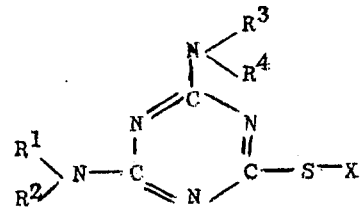

13 Claims, No Drawings

PROCESSES FOR IMPROVING THE PROCESSING CHARACTERISTICS OF VULCANIZED ELASTOMERS

CROSS-REFERENCES TO RELATED APPLICATIONS

This application is a continuation in part of application Ser. No. 122,190, filed Mar. 8, 1971, which in turn is a continuation in part of application Ser. No. 715,541, filed Mar. 25, 1968, both of which applications are now abandoned.

BACKGROUND OF THE INVENTION

A wide variety of vulcanizable compositions containing an elastomer, a reinforcing filler, and sulfur, together with a vulcanizing agent or accelerator such as 2-mercaptobenzothiazole (MBT) and 2-(2-benzothiazolyldithio)-benzothiazole (MBTS) have heretofore been produced.

The effects of a reinforcing filler on an elastomer in a vulcanizate can be determined quantitatively by measurements of the torques of vulcanizates with a cure meter, as described in the article by H. Westlinning and S. Wolff in Kautschuk und Gummi/Kunststoffe, volume 19, No. 8, pages 470–474 (1966). This effect, which will be referred to herein as the $\alpha$ value, is determined in accordance with the following equation:

$$\alpha = \frac{\frac{(D\infty - D_a)_{con}}{(D\infty - D_a)_{sine}} - 1}{mf/mp}$$

in which equation $D_\infty$ is the torque of the vulcanizate at the period $t_\infty{}^{x)}$, $D_a$ is the torque of the uncured vulcanizable composition, $(D_\infty - D_a)_{con}$ is the torque produced by cross-linking of the vulcanizate containing filler at the vulcanization temperature, and $(D_\infty - D_a)_{sine}$ is the torque produced by cross-linking of the vulcanizate without filler at the vulcanization temperature, $mf$ is the concentration of the filler, and $mp$ is the concentration of the polymer or elastomer.

$^{x)}t_\infty$ is the time at which the torque value is constant.

The torques in the foregoing equation can be measured in terms of meter-kiloponds which unit is abbreviated mkp. A kilopond (abbreviated "kp") is a unit of force that is equivalent to 9.80665 newtons.

The $\alpha$ value accordingly represents the sum of the effects of the filler on the deformation characteristics of the elastomer apart from the effects of the cross-linking density of the elastomer. This $\alpha$ value is dependent only upon the filler and the chemical nature of the elastomer. The $\alpha$ values are directly comparable with each other when the vulcanizates that are compared have the same cross-linking density. For example, with different elastomers, using furnace black as filler, the values of $\alpha$ are $1.48 \times 10^{-2}$ for polybutadiene, $1.78 \times 10^{-2}$ for natural rubber, and $2.03 \times 10^{-2}$ for butadiene-styrene rubber which is also known as GR-S rubber. With different fillers, for example, in butadiene-styrene rubber, the values of $\alpha$ are $2.03 \times 10^{-2}$ for furnace black and $1.80 \times 10^{-2}$ for gas black.

An increase in the $\alpha$ value represents a significant improvement in the processing characteristics of a vulcanizate and this characteristic is used herein for characterization and differentiation of the various sym-triazinyl disulfide accelerators that are specified herein.

SUMMARY OF THE INVENTION

The principal object of the present invention is to provide a process or method of improving the processing characteristics of vulcanized compositions or vulcanizates containing an elastomer, a reinforcing filler, and sulfur. More specifically, an object of the present invention is to provide a process of vulcanizing such an elastomeric composition containing a reinforcing filler and sulfur in which the reinforcing effect of the filler in the resulting vulcanizate is increased.

The present invention provides a method of achieving the foregoing objects by use of an effective proportion of a vulcanizing agent consisting of at least one substituted sym-triazinyl disulfide having the formula that is specified hereinafter.

DETAILED DESCRIPTION AND PREFERRED EMBODIMENTS OF THE INVENTION

In accordance with the processes of the present invention, the processing characteristics of vulcanizates which comprise a reinforcing filler, sulfur, and a halogen-free elastomer of the group consisting of natural rubber, polyisoprenes, polybutadienes, copolymers of butadiene and styrene, copolymers of butadiene and acrylonitrile, copolymers of isoprene and isobutene, copolymers of butadiene and isobutene, terpolymers of ethylene, propylene, and dienes, mixtures of the said elastomers with each other, and oil-extended elastomers of the said elastomers, at least one reinforcing filler, and sulfur, are improved substantially when the vulcanizing agent consists of a sym-triazinyl disulfide having the formula

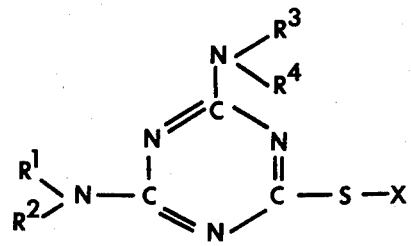

in which $R^1$, $R^2$, $R^3$ and $R^4$ are each a radical of the group consisting of hydrogen, phenyl, alkyl radicals containing up to 18 carbon atoms, alkenyl radicals containing up to 6 carbon atoms, cycloalkyl radicals containing at least 5 and at most 7 carbon atoms, aralkyl radicals containing at least 7 and at most 9 carbon atoms, and the said alkyl, alkenyl, cycloalkyl, phenyl and alkyl radicals that are further substituted with a radical of the group consisting of hydroxyl, cyano, and alkoxy radicals containing up to 18 carbon atoms, and X is a radical of the group consisting of

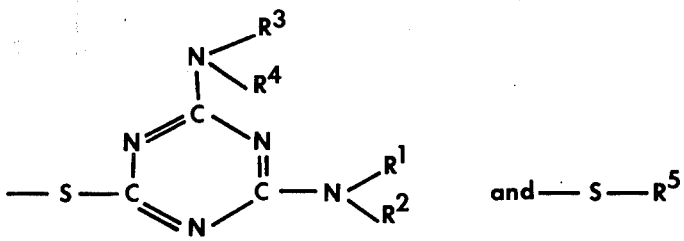

in which $R^1$, $R^2$, $R^3$ and $R^4$ have the same significance as hereinbefore and $R^5$ is a radical of the group consisting of phenyl, benzothiazolyl, carbazolyl, phenothiazinyl, alkyl radicals containing up to 18 carbon atoms, and aralkyl radicals containing at least 7 and at most 9 carbon atoms, or a mixture of one or more of the said substituted sym-triazinyl disulfides in an amount between 0.1 and 50 millimols per 100 grams of the elastomer.

The polybutadienes and polyisoprenes that are referred to herein are to be understood to include 1,4-cis-polybutadiene and 1,4-cis-polyisoprene, and the dienes in the terpolymers of ethylene, propylene, and a diene are to be understood to include dicyclopentadiene and f.i. 5-methylene-norbornene-2 and pentadiene-1,4.

The processes of the present invention are particularly adapted to the production of vulcanizable compositions containing reinforcing fillers such as the carbon blacks that are normally used in the rubber industry, particularly carbon blacks having particle sizes within the range between 100 and 5000 angstroms, and white silica and alimina fillers, such as silica aerogels and fume silicas, particularly those having particle sizes between 100 and 3500 angstroms. The vulcanizable composition will preferably include between 5 and 200 parts by weight of the filler to each 100 parts by weight of the elastomer.

The vulcanizable compositions to which the processes of the present invention are particularly adapted contain between 1 and 300 milligram-atomic weights of sulfur and between 0.1 and 50 millimols of the substituted sym-triazinyl disulfide per 100 grams of the elastomer.

The proportion of sulfur that is present in the composition will be dependent upon the cross-linking density that is required. In the Examples which follow the amounts of sulfur which were used were such as to produce compositions having the same cross-linking density so that the processing characteristics referred to as the $\alpha$ value are strictly comparable with each other.

The sym-triazinyl disulfide vulcanizing agents that are specified herein can be prepared by conventional methods, such as, for example, oxidation of a monomercapto-sym-triazine with iodine, hydrogen peroxide, potassium chlorate, or sodium nitrate. For the production of unsymmetrical disulfides, other methods are required. One such method consists in reacting a monomercapto-sym-triazine with an arylsulfenyl chloride such as benzenesulfenyl chloride in an inert solvent. Another method comprises reacting a Bunte salt such as the sodium salt of an S-arylthiosulfuric acid with the sodium salt of a mercapto-sym-triazine in water. Descriptions of the preparation of typical sym-triazinyl disulfides that are suitable for use in the processes of the present invention follow.

Preparation of sym-triazinyl disulfides having the following general formula:

Preparation b 1: Bis[2-(diethylamino)-4-anilino-6-sym-triazinyl] disulfide (having the foregoing general formula in which $R^1$ is phenyl and $R^2$ is hydrogen, and $R^3$ and $R^4$ are each ethyl).

A solution was prepared by dissolving 27.5 grams of 2-(diethylamino)-4-anilino-6-mercapto-sym-triazine in 110 milliliters of a hot aqueous solution of sodium hydroxide containing 4 grams per liter of sodium hydroxide. The solution was cooled to a temperature of 20°C and 64 milliliters of an aqueous solution of sodium hypochlorite prepared by adding 116 grams of sodium hypochlorite to 1 liter of water was slowly added thereto with stirring. The faintly yellow precipitate, which is the compound named in the heading of this preparation, that soon formed was then separated from the remaining liquid by filtration, washed successively with a dilute aqueous solution of sodium hydroxide and water, and dried. The precipitate that was thus obtained had a melting point of 98°–100°C and weighed 23.5 grams, which amounted to a yield of 86% of the theoretical.

PREPARATIONS 2 to 5

In the same manner as described hereinbefore in connection with Preparation 1, the following sym-triazinyl disulfides which had the melting points specified, were prepared from the corresponding 6-mercapto-sym-triazines:

Preparation 2: Bis[2-(ethylamino)-4-(dibutylamino)-6-sym-triazinyl] disulfide (having the foregoing general formula in which $R^1$ and $R^2$ are each n-butyl and $R^3$ and $R^4$ are respectively hydrogen and ethyl). Melting point: 128°–130°C.

Preparation 3: Bis[2-(ethylamino)-4-(diethylamino)-6-sym-triazinyl] disulfide (having the foregoing general formula in which $R^1$ and $R^2$ are each ethyl and $R^3$ and $R^4$ are respectively hydrogen and ethyl which compound is identified by code number V 143). Melting point: 108°–110°C.

Preparation 4: Bis[2-(diethylamino)-4-(diethylamino)-6-sym-triazinyl] disulfide (having the foregoing general formula in which $R^1$, $R^2$, $R^3$ and $R^4$ are each ethyl). Melting point: 51°–52°C.

Preparation 5: Bis[2-(isobutylamino)-4-(ethylamino)-6-sym-triazinyl] disulfide (having the foregoing general formula in which $R^1$ is ethyl, $R^2$ and $R^3$ are each hydrogen, and $R^4$ is isobutyl). Melting point: 180°C.

Preparation of sym-triazinyl disulfides having the following general formula:

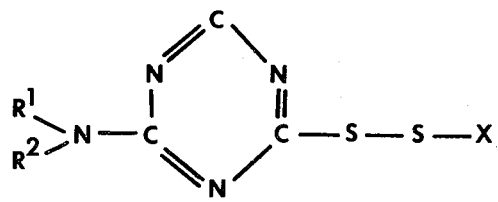

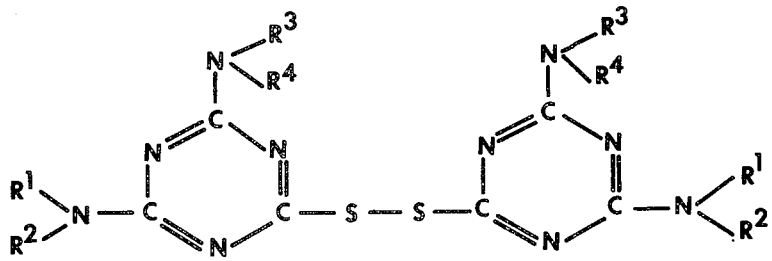

Preparation 6: 2,4-Bis(ethylamino)-6-(n-butyldithio)-sym-triazine (having the foregoing general formula in which X is n-butyl and $R^2$ and $R^4$ are each hydrogen, and $R^1$ and $R^3$ are each ethyl).

To 2 liters of a 0.5-molal aqueous solution of sodium n-butyl thiosulfate [$C_4H_9S.SO_3Na$] was added 199 grams of 2,4-bis(ethylamino)-6-sym-mercapto-sym-triazine and the resulting solution was permitted to stand for several hours, after which period a precipitate formed. This precipitate, which was the compound specified in the heading of this preparation, was then separated by filtration, washed with water, and dried in a vacuum desiccator. The product had a white color and a melting point of 69°C and, after drying, weighed 260 grams, which corresponds to a yield of 93.5% of the theoretical.

Preparation 7: 2,4-Bis(di-n-butylamino)-6-(phenyldithio)-sym-triazine (having the foregoing formula in which X is phenyl and $R^1$, $R^2$, $R^3$ and $R^4$ are each n-butyl).

To a suspension of 36.7 grams of 2,4-bis(di-n-butylamino)-6-mercapto-sym-triazine in 250 milliliters of carbon tetrachloride was added 14.5 grams of benzenesulfenyl chloride ($C_6H_5SCl$) prepared by adding chlorine to a solution of thiophenol in carbon tetrachloride. The mixture was stirred and heated under gentle reflux while the mercapto-triazine dissolved therein and hydrogen chloride was evolved during the course of 1 hour. The resulting solution was then evaporated to dryness at a subatmospheric pressure, leaving a residue consisting of 46.9 grams of a reddish brown pasty mass which consisted essentially of the compound named in the foregoing heading of this preparation and which gave the following results upon elemental analysis:

|  | S | N |
| --- | --- | --- |
| Calculated for $C_{25}H_{41}N_5S_2$ | 15.5% | 14.7% |
| Found | 13.3% | 14.6% |

Preparation 8: 4-Bis(diethylamino)-6-(benzyldithio)-sym-triazine (having the foregoing general formula in which X is benzyl and $R^1$, $R^2$, $R^3$ and $R^4$ are each ethyl).

A solution was prepared by dissolving 100 grams of 2,4-bis(diethylamino)-6-mercapto-sym-triazine in 400 milliliters of an aqueous solution of sodium hydroxide containing 4 grams per liter of sodium hydroxide. Into this solution was then dumped 400 milliliters of a 1-molal solution of sodium benzyl thiosulfate ($C_6H_5CH_2S.SO_3Na$). The oil which soon separated was then extracted by shaking the mixture with methylene chloride and the aqueous phase was separated therefrom. The methylene chloride extract was then evaporated, leaving a residue of 130.4 grams of a faintly yellow-colored oil, which gave the following results upon elemental analysis:

|  | C | H | N | S |
| --- | --- | --- | --- | --- |
| Calculated for $C_{18}H_{27}N_5S_2$ (molecular weight 377) | 57.5% | 7.2% | 18.6% | 16.9% |
| Found | 57.2% | 7.3% | 18.7% | 17.1% |

Preparation 9: 2,4-Bis(diethylamino)-6-(2-benzothiazolyldithio)-sym-triazine (having the foregoing general formula in which X is 2-benzothiazolyl and $R^1$, $R^2$, $R^3$ and $R^4$ are each ethyl).

To a solution of 63.5 grams of 2,4-bis(diethylamino)-6-mercapto-sym-triazine in 500 milliliters of carbon tetrachloride was added 50 grams of 2-mercaptobenzothiazolyl-sulfenyl chloride which was prepared by reaction of chlorine with 2-mercaptobenzothiazole in carbon tetrachloride and the mixture was heated under gentle reflux for 4 hours. After the hydrogen chloride ceased to be evolved the solvent was evaporated at a subatmospheric temperature. The residue was 95 grams of a brown viscous oil which was equivalent to 94% of the theoretical yield. The following results were obtained upon elemental analysis of the oil which is the compound named in the heading of this preparation:

|  | C | H | N | S |
| --- | --- | --- | --- | --- |
| Calculated for $C_{18}H_{24}N_6S_3$ (molecular weight 420) | 51.3% | 5.7% | 20.0% | 22.9% |
| Found | 50.9% | 5.5% | 19.7% | 22.4% |

The following compounds, which are referred to by their code numbers were also prepared in accordance with one of the foregoing general methods:

V 66: Bis[2,4-bis(diethylamino)-6-sym-triazinyl] disulfide

V 143: Bis[2-(ethylamino)-4-(diethylamino)-6-sym-triazinyl] disulfide (Preparation 3 hereinbefore)

V 149: Bis[2,4-bis(ethylamino)-6-sym-triazinyl] disulfide

V 183: Bis[2,4-diamino-6-sym-triazinyl] disulfide

V 187: Bis[2-amino-4-(ethylamino)-6-sym-triazinyl] disulfide

V 188: Bis[2-amino-4-(diethylamino)-6-sym-triazinyl] disulfide

V 200: Bis[2-(diethylamino)-4-(9-carbazolyl)-6-symtriazinyl] disulfide

V 202: Bis[2-(ethylamino)-4-(10-phenothiazinyl)-6-sym-triazinyl] disulfide

V 204: Bis[2-(diisopropylamino)-4-(ethylamino)-6-sym-triazinyl] disulfide

V 205: Bis[2-(diethylamino)-4-(3-methoxy-n-propylamino)-6-sym-triazinyl] disulfide V 206: Bis[2-(dibutylamino)-4-anilino-6-sym-triazinyl] disulfide V 207: Bis[2-(ethylamino)-4-(benzylamino)-6-sym-triazinyl] disulfide V 282: 2-(Ethylamino)-4-(diethylamino)-6-(benzyldithio)-sym-triazine V 283: 2-(Ethylamino)-4-(diethylamino)-6-(ethyldithio)-sym-triazine V 285: 2-Amino-4-(diethylamino)-6-(benzyldithio)-sym-triazine V 286: 2-Amino-4-(diethylamino)-6-(ethyldithio)-sym-triazine V 313: Bis[2-(isopropylamino)-4-(tert-butylamino)-6-sym-triazinyl] disulfide V 314: Bis[2-amino-4-(tert-butylamino)-6-sym-triazinyl] disulfide V 315: Bis[2-(diethylamino)-4-(tert-butylamino)-6-sym-triazinyl] disulfide In the Examples which follow various elastomers were combined with a filler and sulfur and a vulcanizing agent to produce a vulcanizate.

EXAMPLE 1

α Values of butadiene-styrene rubber vulcanizates

In this Example, vulcanizable compositions consisting of the following substances were used. The elastomer used in each of these compositions was a copolymer of butadiene and styrene (76.5:23.5) (SBR).

| | |
|---|---|
| Elastomer | 100 grams |
| High-abrasion furnace black | 40 grams |
| Vulcanizing agent (triazinyl disulfide as specified hereinafter by code number) | 5 millimols |
| Sulfur | 1.98 to 2.17 grams |

The content of sulfur was varied within the range specified to provide an amount in each composition such that the cross-linking density was the same in each composition. The α values were measured at a temperature of 160°C. The compositions were then tested in the cure meter and the α values expressing the effect of the fillers on the elastomers were found to be as follows:

| Vulcanizing Agent (Code Number) | α Value |
|---|---|
| V 66 | $2.02 \times 10^{-2}$ |
| V 149 | $2.37 \times 10^{-2}$ |
| V 187 | $1.44 \times 10^{-2}$ |
| V 188 | $1.77 \times 10^{-2}$ |
| V 200 | $2.73 \times 10^{-2}$ |
| V 202 | $1.98 \times 10^{-2}$ |
| V 204 | $2.03 \times 10^{-2}$ |
| V 205 | $1.95 \times 10^{-2}$ |
| V 206 | $1.92 \times 10^{-2}$ |
| V 207 | $2.35 \times 10^{-2}$ |
| V 143 | $1.85 \times 10^{-2}$ |

When 2-mercaptobenzothiazol and its corresponding disulfide, namely 2-(2-benzothiazolyldithio)benzothiazole, were used as the vulcanizing agent in the same compositions, each produced vulcanizates which had an α value of $1.69 \times 10^{-2}$.

EXAMPLE 2

α Values of natural rubber and 1,4-cis-polybutadiene rubber vulcanizates

In this Example, the vulcanizable compositions consisted of the following substances, in which the elastomer was natural rubber in some cases and a 1,4-cis-polybutadiene rubber in others. The vulcanizable composition had the following composition:

| | |
|---|---|
| Elastomer | 100 grams |
| High-abrasion furnace black | 40 grams |
| Zinc oxide | 3 grams |
| Stearic acid | 2 grams |
| Vulcanizing agent (triazinyl disulfide as specified hereinafter by code number) | 5 millimols |
| Sulfur | 1.26 to 4.5 grams |

As in Example 1, the sulfur content was varied within the specified range to provide an amount in each composition such that the cross-linking density was the same in each composition. The α values were measured at a temperature of 160°C for a period of 60 minutes. The α values were found to be as follows:

| Elastomer | Vulcanizing Agent | α Value |
|---|---|---|
| Natural rubber | V 66 | $2.81 \times 10^{-2}$ |
| Natural rubber | V 149 | $2.24 \times 10^{-2}$ |
| Natural rubber | V 187 | $1.63 \times 10^{-2}$ |
| 1-4-cis-Polybutadiene rubber | V 183 | $3.19 \times 10^{-2}$ |
| 1-4-cis-Polybutadiene rubber | V 200 | $2.94 \times 10^{-2}$ |

In the same natural rubber composition 2-mercaptobenzothiazole and 2-(2-benzothiazolyldithio)benzothiazole each produced a vulcanizate having an α value of $1.36 \times 10^{-2}$ and, in the 1,4-cis-polybutadiene rubber composition, an α value of $1.91 \times 10^{-2}$.

From these results it is evident that substantial increases in the quality of the vulcanizates as represented by the α values can be achieved by selection of suitably substituted triazinyl disulfides.

EXAMPLE 3

Isobutylene-isoprene-rubber vulcanizates (IIR)

In this Example, the vulcanizable compositions consisted of the following substances, in which the elastomer was a copolymer of isobutylene and isoprene which is also known as butyl rubber and IIR.

| | |
|---|---|
| Elastomer | 100 grams |
| High-abrasion furnace black | 50 grams |
| Stearic acid | 2.0 grams |
| Zinc oxide | 3.0 grams |
| Bis[2-(ethylamino)-4-(diethylamino)-6-sym-triazinyl] disulfide (V 143) | 1.13 grams |
| Sulfur | 2.0 grams |

The vulcanization was effected at a temperature of 150°C for a period of 80 minutes.

The properties of the vulcanizate that was thus obtained are listed in Table 1 which follows Example 7 hereinafter.

EXAMPLE 4

Ethylene-propylene-cyclopentadiene terpolymer rubber vulcanizate

In this Example the elastomer was a terpolymer of ethylene, propylene, and cyclopentadiene and the composition was otherwise identical with that specified in Example 3 hereinbefore except that only 1.5, instead of 2.0 grams, of sulfur was used.

The vulcanization was effected at the same temperature (150°C) as in Example 3 for a period of 120 minutes, which period was somewhat longer than in Example 3.

The properties of the resulting vulcanizate are listed in the Table which follows Example 7 hereinafter.

EXAMPLE 5

Butadiene-acrylonitrile (NBR) rubber vulcanizate

In this Example the elastomer was a copolymer of butadiene and acrylonitrile which is also known as NBR rubber and the composition was otherwise identical with that specified in Example 3 hereinbefore. The vulcanization was effected at the same temperature (150°C) and for the same period (80 minutes) as specified in Example 3.

The properties of the resulting vulcanizate are listed in the Table which follows Example 7 hereinafter.

EXAMPLE 6

1,4-cis-Polybutadiene rubber vulcanizate (BR)

In this Example the elastomer was a 1,4-cis-polybutadiene rubber and the elastomer and filler (high-abrasion furnace black) and vulcanizing agent (V 143) were present in the same quantities as specified in Example 3, but only 1.75 grams of sulfur as used and the zinc oxide and stearic acid were omitted. The vulcanization was effected at the same temperature (150°C) and for the same period (80 minutes) as specified in Example 3.

The properties of the resulting vulcanizate are listed in the Table which follows Example 7 hereinafter.

EXAMPLE 7

1-4-cis-Polyisoprene rubber vulcanizate (IR)

In this Example the elastomer was a 1-4-cis-polyisoprene rubber and the composition was otherwise identical with that specified in Example 3 hereinbefore except that it included 2.5 grams, instead of only 2.0 grams, of sulfur. The vulcanization was effected at the same temperature (150°C) but for a longer period (100 minutes) than is specified in Example 3.

The properties of the resulting vulcanizate are listed herein in the following Table.

creases in centigrade degrees, that were observed, are listed in the following Table.

| Vulcanizing Temperature | Temperature Increase | |
|---|---|---|
| | Composition A (CBS) | Composition B (V 143) |
| 145°C | 37 | 31 |
| 155°C | 44 | 36 |
| 165°C | 55 | 44 |
| 175°C | 75 | 48 |

The temperature increase or heat generated during dynamic deformation is an indication of the degree of reversion or degradation of the vulcanizate and destruction of cross-links in its structure. It is to be noted that the temperature increase is considerably smaller with the vulcanizates made with bis[2-(ethylamino)4-(diethylamino)-6-sym-triazinyl] disulfide (V 143) which is composition B, than with the conventional vulcanizing agent in composition A, indicating that less reversion or damage occurs during vulcanization, and that these differences become more pronounced as the vulcanization temperature increases.

EXAMPLES 9 to 13

Natural rubber vulcanizates

A vulcanizable composition was prepared by inti-

TABLE

| Example No. | 3 | 4 | 5 | 6 | 7 |
|---|---|---|---|---|---|
| Tensile strength, kp/cm² | 164 | 156 | 253 | 182 | 178 |
| Modulus at 300%, kp/cm² | 56 | 62 | 248 | 91 | 153 |
| Rebound, % | 8 | 34 | 19 | 45 | 39 |
| Hardness (Shore Durometer) | 57 | 62 | 78 | 62 | 68 |
| Tear Resistance, kp/cm | 17 | 17 | 8 | 18 | 12 |

EXAMPLE 8

Comparison of generation of heat during dynamic deformation of natural rubber vulcanizates.

Two compositions were prepared, each consisting of 100 parts by weight of natural rubber, 40 parts by weight of reinforcing carbon black, 3 parts by weight of zinc oxide, 2 parts by weight of stearic acid, 2.5 parts by weight of sulfur and 0.5 part by weight of a vulcanizing agent. The vulcanizing agent in the first (A) of these two compositions was N-cyclohexyl-2-benzothiazole sulfenamide which is also known as CBS. The vulcanizing agent in the second (B) of these two compositions was bis[2-(ethylamino)-4-(diethylamino)-6-sym-triazinyl] disulfide (V 143). Portions of each of these mixtures were vulcanized at temperatures of 145°, 155°, 165° and 175°C, respectively. The resulting vulcanizates were then subjected to dynamic deformation under identical conditions and the maximum rise in temperature produced during such dynamic deformation was noted. The maximum temperature inmately kneading together 200 parts by weight of natural rubber, 50 parts by weight of reinforcing carbon black, 3 parts by weight of zinc oxide, 2 parts by weight of stearic acid, 2.5 parts by weight of sulfur and 0.5 part by weight of a vulcanizing agent.

The vulcanizing agents that were added to portions of the foregoing composition were the following:

Example 9: 2-(Ethylamino)-4-(diethylamino)-6-(benzyldithio)-sym-triazine (V 282).

Example 10: 2-(Ethylamino)-4-(diethylamino)-6-(ethyldithio)-sym-triazine (V 283).

Example 11: 2-Amino-4-(diethylamino)-6-(benzyldithio)-sym-triazine (V 285).

Example 12: 2-Amino-4-(diethylamino)-6-(ethyldithio)-sym-triazine (V 286).

Example 13: Bis[2-(diethylamino)-4-(tert-butylamino)-6-sym-triazinyl] disulfide (V 315).

Each of the compositions of the foregoing Examples which contained one of the foregoing vulcanizing agents was then vulcanized at a temperature of 150°C for a period of 40 minutes. The characteristics of the resulting vulcanizates are listed in the following Table.

| Example No. | 9 | 10 | 11 | 12 | 13 |
|---|---|---|---|---|---|
| Tensile strength, kp/cm² | 238 | 238 | 222 | 245 | 215 |
| Modulus at 300%, kp/cm² | 162 | 169 | 157 | 167 | 177 |
| Hardness (Shore Durometer) | 72 | 73 | 73 | 74 | 72 |

-continued

| Example No. | 9 | 10 | 11 | 12 | 13 |
|---|---|---|---|---|---|
| Rebound, % | 41 | 41 | 39 | 44 | 42 |

EXAMPLES 14 and 15

Butadiene-styrene rubber vulcanizates

A vulcanizable composition was prepared by intimately kneading together 100 parts by weight of a butadiene-styrene (75 : 25) elastomer, 50 parts by weight of a reinforcing carbon black, 2 parts by weight of stearic acid, 3 parts by weight of zinc oxide, 2 parts by weight of sulfur and 1 part by weight of a vulcanizing agent.

The vulcanizing agents that were used were the following:

Example 14: Bis[2-amino-4-(tert-butylamino)-6-sym-triazinyl] disulfide (V 314).

Example 15: Bis[2-(isopropylamino)-4-(tert-butylamino)-6-sym-triazinyl] disulfide (V 313).

The compositions of each of the foregoing Examples containing one of the foregoing vulcanizing agents were then vulcanized at a temperature of 160°C for a period of 60 minutes. The characteristics of the resulting vulcanizates are listed in the following Table:

| Example No. | 14 | 15 |
|---|---|---|
| Tensile strength, kp/cm² | 250 | 220 |
| Modulus at 300%, kp/cm² | 154 | 162 |
| Hardness (Shore Durometer) | 70 | 72 |
| Rebound, % | 41 | 39 |

EXAMPLE 16

Comparison of natural rubber vulcanizates

In this Example, a vulcanizable composition suitable for the production of tire carcasses were prepared from 100 parts by weight of natural rubber, 45 parts by weight of a reinforcing carbon black, 3 parts by weight of zinc oxide, 2 parts by weight of stearic acid, 2 parts by weight of sulfur and a mixture of 0.8 part by weight of 2-(2-benzothiazolyldithio)benzothiazole (MBTS) and 0.4 part by weight of 2-mercaptobenzothiazole (MBT), both of which are conventional vulcanizing agents. This composition is referred to hereinafter as Composition C.

A comparable vulcanizing composition was made in which 1.2 parts by weight of bis[2-(ethylamino)-4-(diethylamino)-6-sym-triazinyl] disulfide (V 143) was substituted for the foregoing mixture of conventional vulcanizing agents. In this case, however, the content of carbon black in the vulcanizable mixture was reduced from 45 to 25% by weight in order to produce a vulcanizate having the same modulus at 300% as is produced with the vulcanizable mixture containing the mixture of conventional vulcanizing agents. This is referred to in the Table hereinafter as Composition D. The compositions were each vulcanized at a temperature of 140°C for a period of 40 minutes. The resulting vulcanizates were also subjected to dynamic deformation as described in Example 8 hereinbefore. The characteristics of the resulting vulcanizates are listed in the following Table:

| Composition | C | D |
|---|---|---|
| Tensile strength, kp/cm² | 194 | 235 |
| Modulus at 300%, kp/cm² | 137 | 130 |
| Rebound, % | 50 | 71 |
| Hardness (Shore Durometer) | 65 | 60 |
| Temperature increase during dynamic deformation, °C | 45 | 18 |

It is to be noted that the smaller temperature rise during dynamic deformation that was observed in connection with Composition D is probably the result of its smaller content of filler. Automobile tires made from such a composition will be less susceptible to the generation of heat during the operation of the automobile and will accordingly have a longer life and better stress properties.

EXAMPLE 17

Comparison of properties of various vulcanizates

In the Table which follows are listed comparative results obtained when compositions made from different elastomers were vulcanized with respectively the conventional vulcanizing agent 2-(2-benzothiazolyldithio)-benzothiazole (MBTS) and a preferred vulcanizing agent of the present invention, namely 2-bis[2-(ethylamino)-4-diethylamino)-6-sym-triazinyl] disulfide (V 143).

Each of the vulcanizable compositions contained the following substances in the specified amounts:

| Elastomer | 100 parts by weight |
|---|---|
| High-abrasion furnace black | 50 parts by weight |
| Zinc oxide | 3 parts by weight |
| Additional components (as specified in the Table) | |

The elastomers that were used in the various compositions are the following:

Compositions E and F: Natural rubber
Compositions G and H: 1,4-cis-Polyisoprene rubber
Compositions I and J: 1,4-cis-Polybutadiene rubber
Compositions K and L: Styrene-butadiene copolymer rubber Each of the compositions was vulcanized at a temperature of 150°C for a period of 40 minutes.

| Composition | E | F | G | H | I | J | K | L |
|---|---|---|---|---|---|---|---|---|
| Additional components | | | | | | | | |
| Stearic acid, parts by weight | 2 | 2 | 3 | 3 | 2 | 2 | 2 | 2 |
| Sulfur, parts by weight | 2.5 | 2.5 | 2.5 | 2.5 | 1.5 | 1.5 | 2 | 2 |
| MBTS, parts by weight | 0.5 | — | 0.6 | — | 0.9 | — | 1.0 | — |
| V 143, parts by weight | — | 0.5 | — | 0.6 | — | 0.9 | — | 1.0 |
| Mooney scorch time, minutes | 15 | 27 | 14 | 21 | 17 | 23 | 18 | 2 |
| Mooney cure time, minutes | 18 | 29 | 19 | 23 | 23 | 27 | 25 | 2 |

| Composition | E | F | G | H | I | J | K | L |
|---|---|---|---|---|---|---|---|---|
| Tensile strength, kp/cm² | 176 | 243 | 147 | 246 | 121 | 141 | 234 | 25 |
| Modulus at 300%, kp/cm² | 120 | 167 | 89 | 171 | 71 | 80 | 157 | 16 |

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for producing a vulcanized elastomeric composition which includes a filler and has improved processing characteristics which process comprises vulcanizing a vulcanizable composition containing, (a) at least one halogen-free elastomer of the group consisting of natural rubber, polyisoprenes, polybutadienes, copolymers of butadiene and styrene, copolymers of butadiene and acrylonitrile, copolymers of isoprene and isobutene, copolymers of butadiene and isobutene, terpolymers of ethylene, propylene and dienes, mixtures of the said elastomers with each other, and oil-extended elastomers of the said elastomers, (b) at least one reinforcing filler, (c) sulfur, and (d) at least one vulcanizing agent consisting of a substituted sym-triazinyl disulfide having the formula

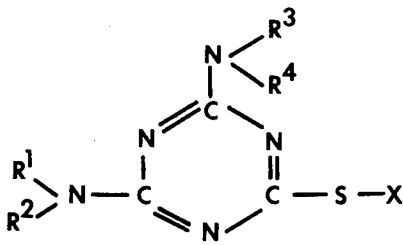

in which formula $R^1$, $R^2$, $R^3$ and $R^4$ are each a radical of the group consisting of hydrogen, phenyl, alkyl radicals containing up to 18 carbon atoms, alkenyl radicals containing up to 6 carbon atoms, cycloalkyl radicals containing at least 5 and at most 7 carbon atoms, aralkyl radicals containing at least 7 and at most 9 carbon atoms, and the said alkyl, alkenyl, cycloalkyl, phenyl and alkyl radicals that are further substituted with a radical of the group consisting of hydroxyl, cyano and alkoxy radicals containing up to 18 carbon atoms, and X is a radical of the group consisting of

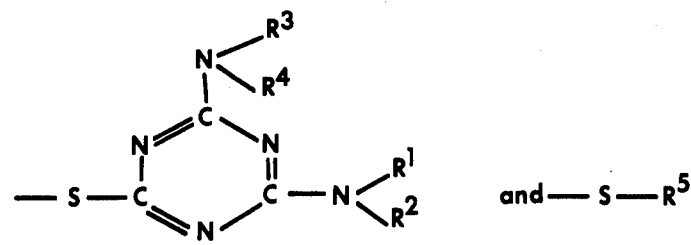

in which formulae $R^1$, $R^2$, $R^3$ and $R^4$ each have the same significance as hereinbefore and $R^5$ is a radical of the group consisting of phenyl, benzothiazolyl, carbazolyl, phenothiazinyl, alkyl radicals containing up to 18 carbon atoms, and aralkyl radicals containing at least 7 and at most 9 carbon atoms, or a mixture of one or more of the said substituted sym-triazinyl disulfides in an amount between 0.1 and 50 millimols per 100 grams of the elastomer.

2. A process as defined in claim 1 in which the sym-triazinyl disulfide is bis[2-(ethylamino)-4-(diethylamino)-6-sym-triazinyl] disulfide.

3. A process as defined in claim 1 in which the substituted sym-triazinyl disulfide is 2-(ethylamino)-4-(diethylamino)-6-(benzyldithio)-sym-triazine.

4. A process as defined in claim 1 in which the substituted sym-triazinyl disulfide is 2-(ethylamino)-4-(diethylamino)-6-(ethyldithio)-sym-triazine.

5. A process as defined in claim 1 in which the substituted sym-triazinyl disulfide is 2-amino-4-(diethylamino)-6-(benzyldithio)-sym-triazine.

6. A process as defined in claim 1 in which the substituted sym-triazinyl disulfide is 2-amino-4-(diethylamino)-6-(ethyldithio)-sym-triazine.

7. A process as defined in claim 1 in which the substituted sym-triazinyl disulfide is bis[2-(diethylamino)-4-(tert-butylamino)-6-sym-triazinyl] disulfide.

8. A process as defined in claim 1 in which the substituted sym-triazinyl disulfide is bis[2-(isopropylamino)-4-tert-butylamino)-6-sym-triazinyl] disulfide.

9. A process as defined in claim 1 in which the substituted sym-triazinyl disulfide is bis[2-amino-4-(tert-butylamino)-6-sym-triazinyl] disulfide.

10. A process as defined in claim 1 in which the substituted sym-triazinyl disulfide vulcanizing agent is present in an amount between 0.1 and 50 millimols per 100 grams of the elastomer.

11. A process as defined in claim 1 in which the reinforcing filler is carbon black, the particles of which have a size between 100 and 5000 angstroms, in an amount equivalent to between 5 and 200 parts by weight to 100 parts by weight of the elastomer.

12. A process as defined in claim 1 in which the reinforcing filler is a finely divided silica filler having a particle size between 100 and 3500 angstroms, in an amount equivalent to between 5 and 200 parts by weight to 100 parts by weight of the elastomer.

13. A process as defined in claim 1 in which the vulcanizable composition comprises sulfur in an amount between 1 and 300 milligram-atomic weights per 100 grams of the elastomer.

* * * * *